United States Patent [19]

Willis, deceased et al.

[11] 3,896,893

[45] July 29, 1975

[54] DIFFERENTIAL TORQUE RESPONSIVE AXLE FOR SMALL VEHICLES

[76] Inventors: Henry Paul Willis, deceased, late of Palm Springs, Calif., by Norman E. Decker, executor, 1122 Wilshire Blvd., Los Angeles, Calif. 90017

[22] Filed: Oct. 1, 1973

[21] Appl. No.: 402,391

[52] U.S. Cl. ................ 180/19 R; 64/30 E; 180/76
[51] Int. Cl. ...................... B60k 23/06; B62d 51/06
[58] Field of Search............... 180/19 R, 27, 76, 75; 192/41 R; 64/30 E; 403/302, 309

[56] References Cited
UNITED STATES PATENTS

| | | | |
|---|---|---|---|
| 1,316,359 | 9/1919 | Decker............................. | 180/19 R |
| 1,895,678 | 1/1933 | Pitter ............................... | 192/41 R |

*Primary Examiner*—David Schonberg
*Assistant Examiner*—John A. Pekar
*Attorney, Agent, or Firm*—Lyon & Lyon

[57] ABSTRACT

A driven axle for a small vehicle such as a golf cart. The axle consists of two coaxially mounted shafts having a sleeve extending over both of the shafts. The sleeve is tightly held to one shaft and is held to the second shaft so that a predetermined level of applied torque will cause the second shaft to twist relative to the sleeve and the first shaft. Thus, the axle will drive coaxially mounted wheels at either end thereof and yet allow turning of the vehicle without substantial wheel slippage.

5 Claims, 5 Drawing Figures

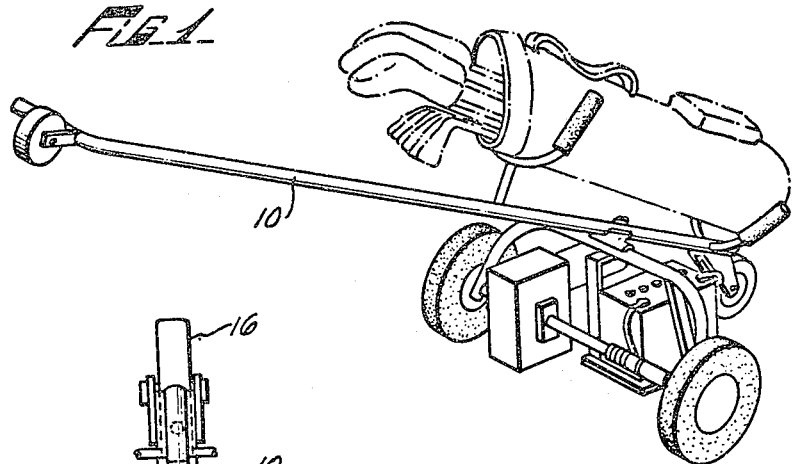
FIG.1.
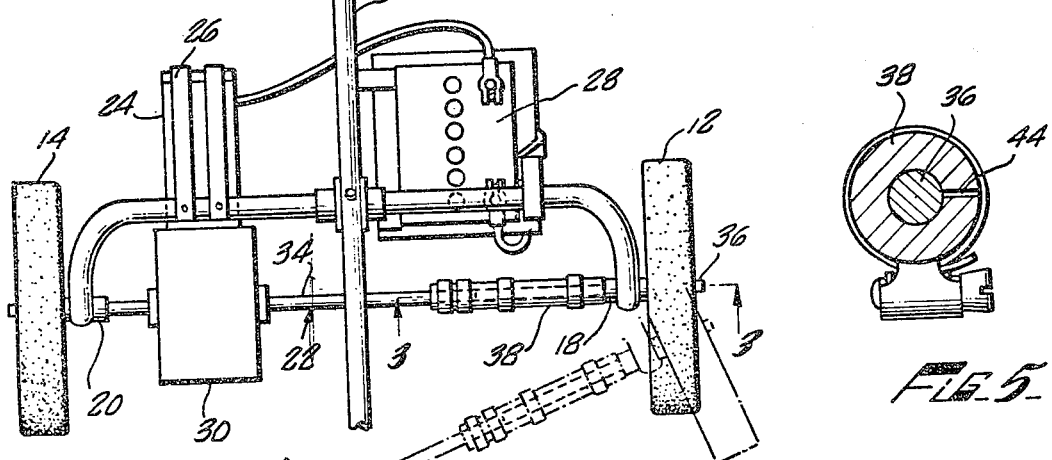
FIG.2.
FIG.5.
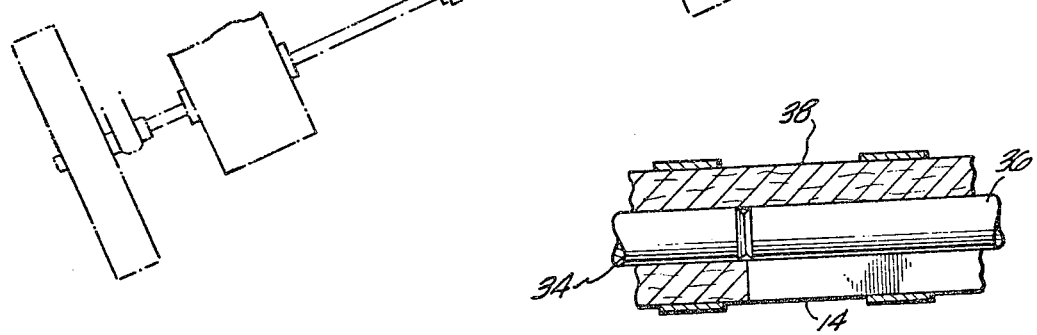
FIG.4.
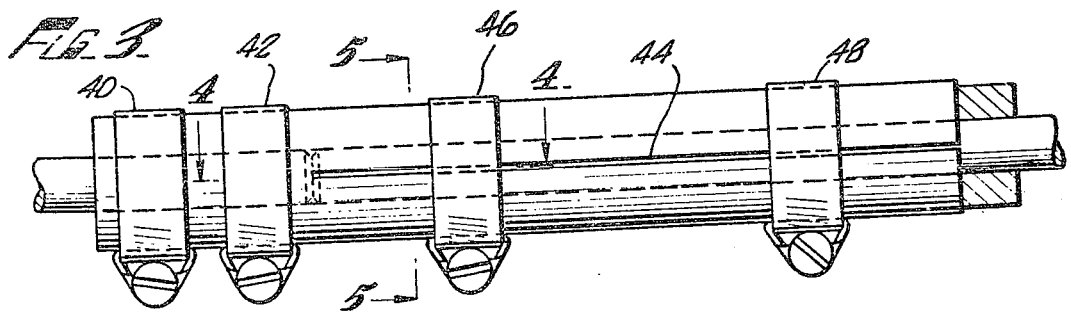
FIG.3.

DIFFERENTIAL TORQUE RESPONSIVE AXLE FOR SMALL VEHICLES

This invention is directed to a driven axle for a small vehicle such as a golf cart having coaxially mounted wheels. More specifically, this invention is directed to an axle which is capable of transmitting torque to two coaxially mounted wheels and also allow the wheels to negotiate a turn without substantial wheel slippage.

Differential mechanisms for axles have been used on large vehicles for providing torque to both wheels during straight line motion and allowing differential wheel speeds during turning of the vehicle. Such devices have generally employed gears or ratchet mechanisms which are typically both heavy and expensive. Consequently, such devices have not gained general acceptance for use on small vehicles such as golf carts and the like. Further ratchet like mechanisms are generally capable of transmitting torque only in a first direction. Consequently, in such devices, the power system cannot be employed for retarding the vehicle when the vehicle is proceeding down hill.

The present invention is embodied in a driven axle for a vehicle having a pair of coaxially mounted wheels. The axle includes two coaxially mounted shafts, each associated with one of the pair of wheels. A sleeve is positioned over the two coaxial shafts. The sleeve is tightly held to one of the shafts and includes a radial slit adjacent the second shaft to allow a certain degree of relative rotational motion between the sleeve and the second shaft. Band clamps are employed to tighten the sleeve about this second shaft so that a predetermined torque will be required to drive the second shaft relative to the sleeve.

This differential torque responsive axle is ideal for small vehicles such as golf carts where weight and expense are important factors. Golf carts which have not had a differential mechanism between the two main wheels have been found to be relatively hard to steer. On the other hand, carts having differential and ratchet type mechanisms have been found to be too expensive and heavy for practical golfing requirements. The present invention overcomes these difficulties. It may be constructed for very little money and is extremely light weight. Further, the device operates to make turning easier through the slippage of one of the shafts relative to the sleeve. At the same time, straight line motion is generally obtained without biasing, a characteristic associated with similar vehicles driven through a single wheel. The axle also transmits the retarding force of the motor when the vehicle is moving downhill.

Accordingly, it is an object of the present invention to provide a torque responsive axle for small vehicles which is both inexpensive and light weight.

It is another object of the present invention to provide an axle for a small light weight vehicle capable of transmitting torque to two coaxially mounted wheels during straight line motion and allowing differential speeds during turning of the vehicle.

A further object of the present invention is to provide a sleeve positioned over two coaxially aligned shafts to form a torque responsive axle.

FIG. 1 is a perspective view of a golf cart employing the present invention.

FIG. 2 is a top view of the golf cart illustrating the employment of the present invention.

FIG. 3 is a detailed side view of the assembled sleeve and shafts.

FIG. 4 is a cross-sectional view taken along lines 4—4 of FIG. 3 illustrating the internal configuration of the axle.

FIG. 5 is a cross-sectional view of the present invention taken along line 5—5 of FIG. 3.

Turning specifically to the drawing, a torque responsive axle of the present invention is illustrated as used with a motorized golf cart. A conventional golf cart 10 is employed which has three wheels, a pair of coaxially aligned wheels 12 and 14 and a caster 16. The coaxially aligned wheels 12 and 14 are supported by bearings 18 and 20 which are conventionally fixed to the frame of the cart 10. A driven axle assembly 22 extends between the coaxially aligned wheels 12 and 14 through bearings 18 and 20. The driven axle assembly 22 is powered in this embodiment by an electric motor 24 rigidly mounted to the frame of the cart 10 by a motor support frame 26. A battery 28 is employed to drive the electric motor 24 which in turn powers the driven axle assembly 22 through a transmission 30. The transmission should be geared so that the motor is run at an efficient speed when the cart 10 is moving at a comfortable walking speed.

Comprising the driven axle assembly 22, a shaft 34 extends from the wheel 14 laterally across the cart in a first direction. Another shaft 36 extends from wheel 12 inwardly in an opposite direction to meet shaft 34. A sleeve 38 is positioned over the inner ends of the shafts 34 and 36 to retain axial alignment therebetween and operably couple each shaft with the other. Each wheel 12 and 14 is constrained to rotate with its respective shaft 36 and 34 in order that the driving torque may be transmitted through each respective shaft to the coaxially aligned wheels. Power is thereby directed from the motor 23 through the transmission 30 to the shaft 34. The shaft 34 distributes this power directly to wheel 14 and through the sleeve 38 and shaft 36 to the wheel 12.

The sleeve 38 is employed to operatively couple the shafts 34 and 36 together in order that torque may be transmitted when desirable from the motor 24 to the wheel 12 as well as to the wheel 14. The sleeve 38 is, in the present embodiment, a cylindrical block of wood with an axial hole therethrough for receipt of shafts 34 and 36. It has been found that wood is a preferred material for the sleeve 38 because of its resiliency, its relative compressibility and flexibility, its porosity which permits the retention of lubricants, and its comparative lightness. The hole extending axially through the sleeve 38 is approximately the same diameter as the shafts 34 and 36. In order that the device may operate properly, it is necessary that a significant amount of torque be required to rotate either shaft relative to the sleeve 38. Consequently, it is preferable that the sleeve fit over the shafts 34 and 36 without a great deal of clearance.

The sleeve 38 is held fixed to shaft 34 by means of two steel band clamps 40 and 42. The clamps 40 and 42 include adjustable worm screws for tightening the bands to compress the wood about the shaft 34. Because of the compressible nature of the wood, the sleeve 38 will remain fixed relative to the shaft 34 under the influence of the bands 40 and 42. It is preferable that the sleeve 38 remain fixed relative to one or the other of the shafts 34 and 36. In this way, the sleeve 38 will remain fixed laterally on the driven axle assembly and will not migrate slowly in either direction. An alternate embodiment not departing from the inventive concepts herein would include the sleeve 38 being tightly held to the other shaft 36.

A radial slit 44 extends through the wall of the sleeve 38 adjacent the shaft 36. The slit 44 allows relatively free movement of the shaft 36 relative to the sleeve 38. Thus, the assembled axle would drive only wheel 14. Wheel 12 with corresponding shaft 36 would be free to rotate slower or faster than shaft 34 depending on the motion of the cart. However, it is desirable that torque be applied to both wheels 12 and 14. To accomplish this, means are provided for exerting pressure on the sleeve 38 about the shaft 36. In the present embodiment, these means include two steel band clamps 46 and 48 identical to the steel band clamps 40 and 42 employed about the sleeve over shaft 34.

These clamps 46 and 48 may be tightened about the split portion of the sleeve 38 to a desirable pressure such that when the cart 10 is directed in a straight line, there is very little or no slippage between the sleeve 38 and the shaft 36. The cart will therefore maintain a substantially straight course without undue steering requirements of the operator. It is also preferrable to maintain the clamps 46 and 48 at a stress level which would allow the resisting torque of the wheel 12 to overcome the friction between the shaft 36 and the sleeve 38 when the cart is directed in a turn. As the cart is turned, wheel 12 will either be required to move faster or slower than wheel 14 because of the difference in turning radius between the inside and outside wheel. This motion is induced by the lateral pressure on the handle of the cart 10 exerted by the operator. A level of stress in the clamps 46 and 48 may therefore be regulated to suit the preference of the operator as to the amount of torque required to release wheel 12 from the rotational motion of shaft 34.

It has been found that a smoother and more uniform response to torque applied to the sleeve is achieved through the use of a lubricant between the sleeve 38 and the shaft 36. A dry lubricant composed of silicon and graphite has been found to provide excellent results in this application. As mentioned above, the wooden sleeve is able to retain the lubricant because of its porous nature.

Thus, a differential torque responsive driven axle is provided which finds beneficial use as a golf cart drive train allowing both straight line and turning motions of the cart. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A driven axle for a vehicle having a pair of coaxially mounted wheels, comprising
 a first shaft, said first shaft being rotatably mounted to the vehicle;
 a second shaft, said second shaft being rotatably mounted to the vehicle and being coaxial with said first shaft;
 a sleeve, said sleeve being positioned over said first and said second coaxial shafts, said sleeve being tightly held to said first shaft and having a radial slit through the wall thereof adjacent said second shaft; and
 means for exerting pressure on said sleeve about said second shaft in order that a predetermined level of applied torque is required to twist said second shaft relative to said sleeve.

2. The axle of claim 1 wherein said pressure exerting means comprise adjustable band clamps.

3. The axle of claim 1 wherein said sleeve is wood.

4. The axle of claim 1 wherein said sleeve is constrained to rotate with said first shaft by band clamps.

5. A power golf cart comprising
 a frame;
 a first shaft rotatably mounted to said frame;
 a first wheel positioned at one end of said first shaft and constrained to rotate therewith;
 a second shaft rotatably mounted on said frame, said second shaft being coaxially aligned with said first shaft;
 a second wheel positioned on the end of said second shaft and being constrained to rotate therewith;
 drive means for driving said first shaft;
 a sleeve, said sleeve being positioned over said first and said second coaxial shafts, said sleeve being tightly held to said first shaft and having a radial slit through the wall thereof adjacent said second shaft; and
 means for exerting pressure on said sleeve about said second shaft in order that a predetermined level of applied torque is required to twist said second shaft relative to said sleeve.

* * * * *